(12) United States Patent
Kumar

(10) Patent No.: US 9,633,255 B2
(45) Date of Patent: Apr. 25, 2017

(54) SUBSTITUTION OF HANDWRITTEN TEXT WITH A CUSTOM HANDWRITTEN FONT

(71) Applicant: Intel Corporation, Santa Clara, CA (US)

(72) Inventor: Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/752,529

(22) Filed: Jun. 26, 2015

(65) Prior Publication Data
US 2016/0379048 A1 Dec. 29, 2016

(51) Int. Cl.
G06K 9/00 (2006.01)
G06F 3/033 (2013.01)
G06T 11/60 (2006.01)
G06K 9/62 (2006.01)

(52) U.S. Cl.
CPC ....... *G06K 9/00409* (2013.01); *G06K 9/6256* (2013.01); *G06T 11/60* (2013.01)

(58) Field of Classification Search
CPC .... G06K 9/00409; G06K 9/6256; G06K 9/66; G06K 9/6217; G06K 9/6282; G06T 11/60; G06F 17/30256
USPC ....... 382/100, 115, 119, 159, 181, 187, 189, 382/186, 173, 177, 309, 310, 190, 195, 382/202, 229, 311, 209, 224, 228, 312, 382/313, 314, 185, 199, 200, 305, 276, 382/179; 345/173, 179, 467, 156, 471, 345/418; 709/203, 246, 217, 201; 715/788, 804, 863, 227, 222, 700, 764, 715/781, 200, 221
See application file for complete search history.

(56) References Cited

U.S. PATENT DOCUMENTS

| | | | |
|---|---|---|---|
| 5,327,342 A | 7/1994 | Roy | |
| 5,412,771 A * | 5/1995 | Fenwick | G06F 17/214 345/468 |
| 6,298,154 B1 * | 10/2001 | Cok | G06K 9/222 345/467 |
| 9,330,331 B2 * | 5/2016 | Kasthuri | G06K 9/4609 |
| 9,342,501 B2 * | 5/2016 | Beaumont | G06F 17/2264 |
| 2012/0001922 A1 | 1/2012 | Escher et al. | |
| 2013/0181995 A1 | 7/2013 | Zhou et al. | |
| 2013/0343639 A1 | 12/2013 | Benko et al. | |
| 2015/0130724 A1 * | 5/2015 | Feng | G06F 3/04883 345/173 |

(Continued)

FOREIGN PATENT DOCUMENTS

WO 2011081954 A1 7/2011

OTHER PUBLICATIONS

International Search Report and Written Opinion for International Patent Application No. PCT/US2016/034076, mailed on Sep. 7, 2016, 14 pages.

*Primary Examiner* — Sheela C Chawan
(74) *Attorney, Agent, or Firm* — Jordan IP Law, LLC

(57) ABSTRACT

Systems, apparatuses and methods may provide font substitution based on a custom font. In one example, a custom handwritten font may be generated based on a comparison between handwritten sample text and training text. In another example, handwritten original text may be converted to unique machine text based on a substitution of the handwritten original text with the custom handwritten font. Thus, a user's handwriting may be converted to the user's own best or preferred handwriting.

21 Claims, 4 Drawing Sheets

(56) References Cited

U.S. PATENT DOCUMENTS

| | | | |
|---|---|---|---|
| 2015/0310267 A1* | 10/2015 | Nicholson | G06K 9/00409 345/173 |
| 2016/0179364 A1* | 6/2016 | Nicholson | G06K 9/00416 715/863 |
| 2016/0179764 A1* | 6/2016 | Kelso | G06F 17/214 715/244 |
| 2016/0179772 A1* | 6/2016 | Perrin | G06F 17/24 715/268 |
| 2016/0180161 A1* | 6/2016 | Novak | G06T 11/60 382/189 |

* cited by examiner

SUBSTITUTION OF HANDWRITTEN TEXT WITH A CUSTOM HANDWRITTEN FONT

TECHNICAL FIELD

Embodiments generally relate to text substitution. More particularly, embodiments relate to substitution of handwritten text with a custom handwritten font.

BACKGROUND

Conventional handwriting architectures, such as text editors, may convert original handwritten text to standard machine text based on a standard font (e.g., a standard printed font such as Times New Roman, Courier, etc.). Accordingly, the standard machine text may appear the same across all handwriting architectures and/or may appear the same for all users. Also, a relatively large amount of heuristic data may be needed to determine what a user indented to write, which may cause resource inefficiencies (e.g., power inefficiencies, processor utilization inefficiencies, etc.), burdensome user experience (e.g., frequent or redundant corrections, etc.), and so on. Thus, there is considerable room for improved handwriting architectures.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
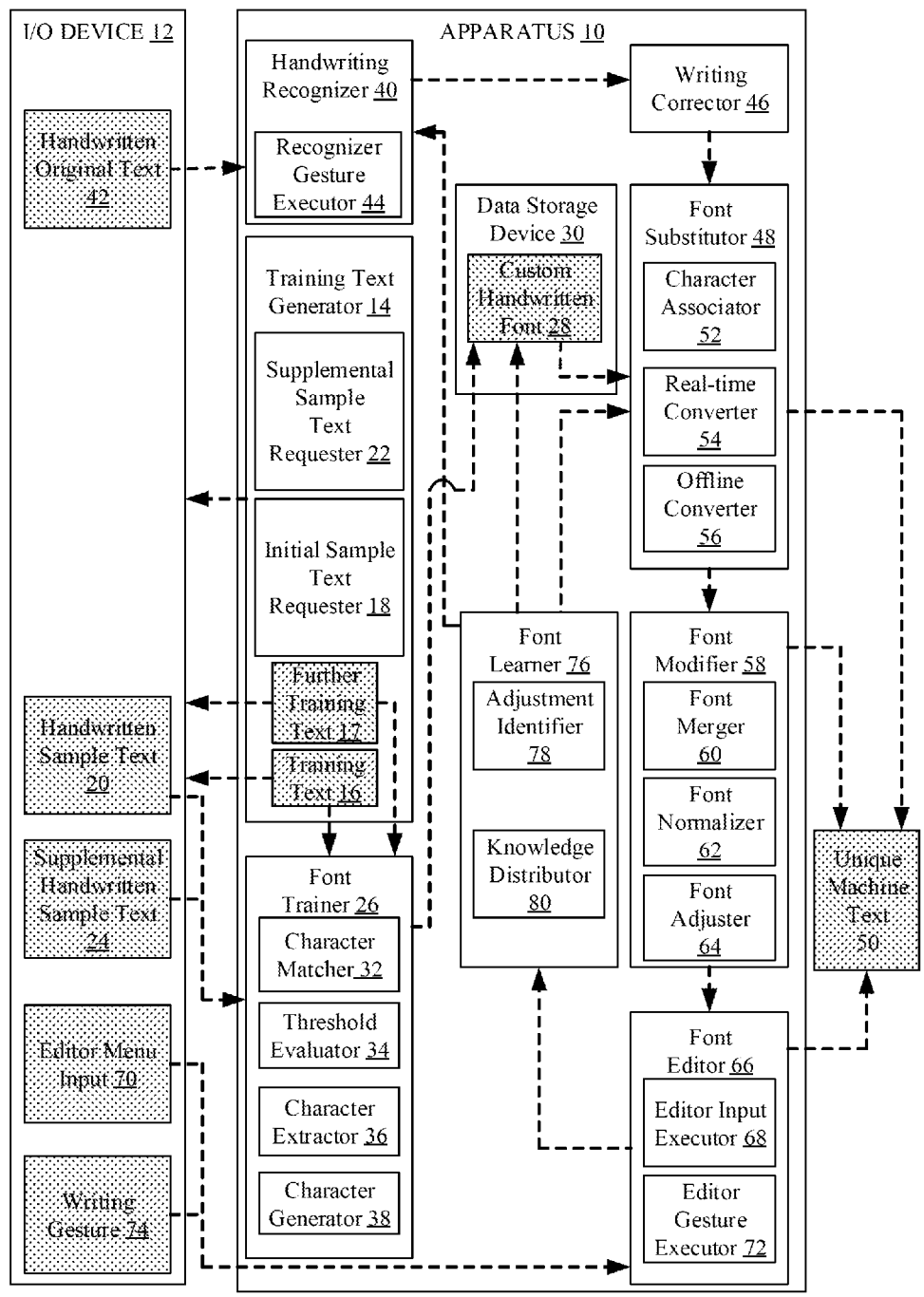
FIG. 1 is a block diagram of an example of an apparatus to provide a custom handwritten font and/or to provide text substitution according to an embodiment.

FIG. 1 illustrates an apparatus 10 that may include a computing platform such as, for example, a desktop computer, a notebook computer, a tablet computer, a convertible tablet, a personal digital assistant (PDA), a mobile Internet device (MID), a media player, a smart phone, a smart televisions (TV), a radio, an infotainment system, a wearable device, a gaming platform, a server platform, and so on. As discussed below, the apparatus 10 may generate a custom handwritten font and/or unique machine text. Notably, the custom handwritten font may be different across all text editors and/or all users to provide a personal look and feel for handwritten communications (e.g., a letter, a note, etc.) via the unique machine text. Thus, the custom handwritten font and/or the unique machine text may provide a closer connection between a reader and an author (e.g., a personalized note to friends, family, colleagues, etc.).

In the illustrated example, the apparatus 10 is coupled with an input/output (I/O) device 12. In one example, the I/O device 12 may include a track pad, an audio device (e.g., a speaker, etc.), and so on. In another example, the I/O device 12 may include a display device with a touch screen such as a liquid crystal display (LCD), a light-emitting diode (LED), and so on. Thus, the I/O device 12 may operate as a user interface for input of handwritten text (e.g., handwritten characters), wherein a user may utilize a writing implement such as a stylus or a finger to input the handwritten text. In addition, the apparatus 10 may implement the I/O device 12 to communicate with a user. For example, the I/O device 12 may be used to prompt a user for input via, e.g., a visual prompt, an audio prompt, etc., may display the handwritten text that a user is writing, etc.

In the illustrated example, the apparatus 10 includes a training text generator 14 that may generate training text 16 provided in a prompt to a user. The training text 16 may include a plurality of machine characters that constitute text a user is to write in his/her best (e.g., neatest, etc.) or preferred (e.g., cursive, printed, etc.) handwriting. The training text 16 may include initial training text, such as predefined text that has all letters of a particular alphabet, all numerals, and predetermined special characters of the particular alphabet. The training text 16 may be free-flowing text to encourage a user to write in a natural flow. Thus, the training text 16 may not be limited to writing a consecutive alphabet of capital letters, of lower-case letters, and so on.

In one example for the English language, the training text 16 may include at least twenty-six words that start with twenty-six upper case letters, at least twenty-six words that start with lower case letters, and at least twenty-six words that end with lower case letters. The 78 words of the training text 16 may also include all the lowercase letters in the middle of the words. The training text 16 may include a maximum of about 100 English words. Moreover, punctuation marks and special characters such as #@$%&!~*(){ }[ ] may be included in the training text 16. Thus, burden to a user may be minimized while maximizing writing in a natural flow.

In the illustrated example, the training text generator 14 includes an initial sample text requester 18 that may prompt a user for handwritten sample text 20 (e.g., handwritten text that a user writes in his/her best or preferred natural handwriting) based on the training text 16. For example, the initial sample text requester 18 may provide a visual prompt via a graphical user interface that displays the training text 16 with an instruction to reproduce all of the training text 16 in a best or preferred handwriting. Thus, the handwritten sample text 20 may include unique writing of a user such as a cursive style unique to a user, a print writing style unique to a user, and so on. A user may be given opportunities to erase mistakes and re-write characters using menu inputs, writing gestures, and so on.

The handwritten sample text 20 need not reproduce all characters of the training text 16. For example, at least 50% (e.g., between about 65% and 85%, etc.) of the handwritten sample text 20 may be recognized to successfully complete a training phase where a user writes the training text 16 in his/her best or preferred handwriting as instructed (e.g., exactly as displayed, different than displayed but with characters such as letters, words, punctuation marks, etc., in the same sequence and order as training text, etc.). In this regard, the illustrated training text generator 14 also includes a supplemental sample text requester 22 that may prompt a user for supplemental handwritten sample text 24 based on further training text 17 to satisfy a predetermined match threshold (e.g., at least 50%) when at least 50% of the handwritten sample text 20 is not recognized. For example, a user may be prompted to write a few extra words to reach a goal of at least 50% recognition from a combination of the handwritten sample text 20 and the supplemental handwritten sample text 24.

In the illustrated example, the apparatus 10 further includes a font trainer 26 that may receive handwritten sample text 20, may receive the training text 16 from the training text generator 14 (and/or data storage), and my generate a custom handwritten font 28 based on a comparison between the handwritten sample text 20 and the training text 16. Similarly, the font trainer 26 may generate the custom handwritten font 28 based on a comparison between the supplemental handwritten sample text 24 and the further training text 17. The custom handwritten font 28 may be stored in a data storage device 30 such as memory, hard disk drive, and so on. In one example, the custom handwritten font 28 may be stored in a custom font database at the data storage device 30.

The illustrated font trainer 26 further includes a character matcher 32 that may match characters from the handwritten sample text 20 with characters from the training text 16. Matching may include, for example, character recognition processes to match features and/or patterns of handwritten characters from the handwritten sample text 20 with features and/or patterns of expected characters from the training text 16. In one example, the character matcher 34 may perform a closeness test to determine whether a handwritten character from the handwritten sample text 20 is within a closeness range for an expected character from the training text 16 to be recognized. The closeness range may account for a closeness of a feature (e.g., weight, slope, etc.) between a handwritten character and an expected character, including maximum acceptable predetermined feature variance. The closeness range may also account for a closeness of a pattern (e.g., sequence of characters, pattern of features, etc.) between a handwritten character and an expected character, including acceptable maximum predetermined pattern variance.

Accordingly, efficiency may be maximized since heuristic data (e.g., using a dictionary to match a word, etc.) may not be needed. In addition, mistakes (e.g., false-positives, false negatives, etc.) may be minimized since the character matcher 32 may know what the user wrote and what is expected (e.g., based on knowledge of expected characters). Moreover, a determination that a handwritten character is within a predetermined closeness range to be recognized as corresponding to an expected character may promote self-learning of a user's writing style.

The illustrated font trainer 26 further includes a threshold evaluator 34 that may determine whether a predetermined match threshold is satisfied. For example, a predetermined match threshold of at least 50% may indicate that at least 50% of the handwritten sample text 20 is recognized (e.g., at least 50% of the handwritten characters are reliably matched). A handwritten character may be ignored and/or marked as unmatched, for example, when a closeness test indicates that a user accidentally wrote a different character than expected (e.g., based on feature/pattern dissimilarity, identification of a handwritten character, etc.). When, at an end of a training process, more than 50% of a character set is marked as unmatched, a user may be prompted by the supplemental sample text requester 18 to write extra words to reach the goal of at least 50% (e.g., 70%) match and/or recognition for a combination of the handwritten sample text 20 and the supplemental handwritten sample text 24. In this regard, the character matcher 32 may match characters from the supplemental handwritten sample text 24 with the further training text 17.

The illustrated font trainer 26 further includes a character extractor 36 that may extract characters from the handwritten sample text 20 which are matched with characters from the training text 16. In one example, handwritten characters from the handwritten sample text 20 may be marked as matched and immediately stored in the custom handwritten font 28. Similarly, the character extractor 36 may extract characters from the supplemental handwritten sample text 24 which are matched with characters from the further training text 17 for immediate storage. In another example, handwritten characters from the handwritten sample text 20 may be marked as matched and stored in the custom handwritten font 28 when a predetermined amount of the handwritten sample text 20 (e.g., 100%) is evaluated (e.g., a closeness test completed for all the character set).

The illustrated font trainer 26 further includes a character generator 38 that may synthesize characters for unmatched characters between the handwritten sample text 20 and the training text 16 that may match a user's handwriting style. Similarly, the character generator 38 may synthesize characters for unmatched characters between the supplemental handwritten sample text 24 and the further training text 17. When, at an end of a training process, more than, e.g., 50% but less than, e.g., 100% of the character set is matched, the character generator 38 may automatically create missing characters based on a learned user's writing style to provide, e.g., 100% of the character set.

For example, the character generator 38 may determine a weight, a width, a slope, a pattern, etc., corresponding to a handwritten character (e.g., an open parenthesis) and synthesize a machine character based on a feature and/or a pattern (e.g., a same or similar feature and/or pattern to synthesize a close parenthesis). Synthesized machine characters may be stored immediately in the custom handwritten font 28 and/or may be stored when a predetermined number of machine characters (e.g., all missing handwritten characters, etc.) are synthesized for handwritten sample text 20 and/or the supplemental handwritten sample text 24. Thus, machine characters from the custom handwritten font 28 may be unique for each user, wherein the custom handwritten font 28 may reflect a user's unique handwriting. In addition, a training phase may only be completed once and may not need to be repeated again unless a user wishes to update the custom handwritten font 28 in response to, e.g., a change in the user's best or preferred writing style.

In the illustrated example, the apparatus 10 further includes a handwriting recognizer 40 that may recognize handwritten original text 42. In one example, the handwriting recognizer 40 may determine an identity of an original character of the handwritten original text 42 based on feature and/or pattern recognition processes. In another example, the custom handwritten font 28 may be utilized as a handwriting recognition template to identify an original character of the handwritten original text 42. The handwritten original text 42 may be original text with respect to training text.

The illustrated handwriting recognizer 40 includes a recognizer gesture executor 44 that may process the handwritten original text 42 based on a writing gesture. The writing gesture may include, for example, a strikethrough gesture such as an approximate horizontal line (e.g., approximately parallel to a writing plane for the text) through a character, through a word, etc. The strikethrough gesture may also include, for example, a double line, a meandering line, a scribble, and so on. In this case, the recognizer gesture executor 44 may ignore and/or erase a portion (e.g., a character, a word, etc.) of the handwritten original text 42 based on the strikethrough gesture.

The writing gesture may also include a split gesture such as an approximate vertical line (e.g., approximately perpendicular to a writing plane for the text) between two characters, through a word, etc. The split gesture may also include, for example, a double line, a meandering line, a scribble, and so on. In this case, the recognizer gesture executor 44 may separate a portion (e.g., two characters, a word, etc.) of the handwritten original text 42 based on the split gesture. For example, the recognizer gesture executor 44 may separate the word "everyday" to "every day."

The writing gesture may also include a replacement gesture such as an approximate circle together with a vertical or horizontal line over a character, over a word, etc. The replacement gesture may also include, for example, an approximate rectangle, square, triangle, etc., together with a double line, a meandering line, a scribble, and so on. In this case, the recognizer gesture executor 44 may create a blank space in a portion (e.g., a blank space in a sentence, etc.) of the handwritten original text 42 based on the replacement gesture to allow a user to write a new character (e.g., a new word, etc.) in the blank space. The writing gesture may also include an overwrite gesture such as a character or a word overwritten by another character or a word (e.g., a character with a heavier weight, width, etc.). In this case, the recognizer gesture executor 44 may replace a portion (e.g., a character, a word, etc.) of the handwritten original text 42 based on the overwrite gesture.

Additional convenience writing gestures may be added by a user via a gesture user interface and/or may be provided to a user as a predetermined set of writing gestures that may be modified via the gesture user interface. Thus, for example, the recognizer gesture executor 44 may utilize any writing gesture when the meaning of the writing gesture is understood or predefined. Moreover, a writing gesture may be utilized as a shortcut with conventional editing capabilities, such as a when an electronic stylus is used to finalize an execution command for an existing writing gesture, a right click to a menu selection is used to finalize an execution command for an existing writing gesture, etc.

The illustrated apparatus 10 further includes a writing corrector 46 that may correct a typo, a misspelling, a punctuation, usage, grammar, syntax, consistency, and/or accuracy of the handwritten original text 42. Thus, for example, the writing corrector 46 may include a dictionary corrector, a grammar corrector, etc., to correct syntax mistakes, grammatical mistakes, and so on. In addition, the illustrated apparatus 10 further includes a font substitutor 48 that may receive the handwritten original text 42, corrected or uncorrected, may receive the custom handwritten font 28 from, e.g., the data storage device 30, and may convert the handwritten original text 42 to unique machine text 50 based on a substitution of the handwritten original text 42 with the custom handwritten font 28. Thus, a user's handwriting may be converted to the user's own best or preferred unique handwriting.

In the illustrated example, the font substitutor 48 includes a character associator 52 that may associate characters from the handwritten original text 42 with characters from the custom handwritten font 28. In this regard, an association process may be relatively effective and/or efficient since there may be minimized variance among the character sets. The character associator 52 may, however, implement match processes to resolve variances among the character sets.

The illustrated font substitutor 48 further includes a real-time converter 54 that may convert the handwritten original text 42 to the unique machine text 50 based on a writing threshold as the handwritten original text 42 is being created. In one example, a user may contact a writing surface (e.g., a touch screen, a track pad, etc.) with a writing implement to write original characters until the user stops writing. At that time, the user may lift the writing implement such that a contact pressure change satisfies a pressure threshold and indicates that a portion of the handwritten original text 42 is finished.

For example, the user may lift the writing implement between each character when writing in a print style, may lift the writing implement at the end of a word when writing in a cursive style, and so on. In this case, the real-time converter 54 may substitute the original characters from the handwritten original text 42 with characters from the custom handwritten font 28, in real-time. Moreover, a user may observe the conversion in real-time and make changes to the substituted character using, for example, a menu input, a writing gesture, and so on. Thus, for example, a word may be deleted immediately when a user returns to a converted word and crosses the converted word out.

In another example, a user may use a writing implement to hover over a writing surface (e.g., a touch screen, a track pad, etc.) and write original characters until the user stops writing. At that time, the user may move the writing implement away from the writing surface a distance that satisfies a distance threshold to indicate that a portion of the handwritten original text 42 is finished. For example, the user may lift the writing implement between each character above a predetermined hover distance (e.g., about 2 mm) when writing in a print style, may lift the writing implement at the end of a word above a predetermined hover distance when writing in a cursive style, and so on. Similarly, a speed that the user is writing may be used to satisfy a speed threshold signaling when writing is ongoing or has stopped. In this case, the real-time converter 54 may substitute the original handwritten characters from the handwritten original text 42 with characters from the custom handwritten font 28, in real-time.

The illustrated font substitutor 48 also includes an offline converter 56 that may convert the handwritten original text 42 to the unique machine text 50 based on a conversion user input when the handwritten original text 42 is created. For example, a conversion menu (e.g., a screen dialog hotkey, a right click menu, etc.) may be utilized by a user after the handwritten original text 42 is created to convert a portion or all of the handwritten original text 42 to the unique machine text 50 at the same time.

The illustrated apparatus 10 further includes a font modifier 58 that may modify the unique machine text 50. The illustrated font modifier 58 includes a font merger 60 that may smoothly merge the unique machine text 50. For example, the font merger 60 may smoothly connect characters of a cursive word in the unique machine text 50. In addition, the illustrated font modifier 58 includes a font normalizer 62 that may normalize a size of the unique machine text 50, a spacing of the unique machine text 50, and so on. In one example, the font normalizer 62 may translate a size and/or a spacing of original characters in the handwritten original text 42 to the characters of the custom handwritten font 28 to normalize a size and/or a spacing of the unique machine text 50 according to a user preference (e.g., when a user wishes to emphasize a character by size and/or a space). In another example, the font normalizer 62 may normalize all of the characters of the unique machine text 50 to the same font size and/or font spacing.

The illustrated font modifier 58 further includes a font adjuster 64 that may adjust a color of the unique machine text 50, a style of the unique machine text 50, and so on. For example, the font adjuster 64 may set a font style such as regular, italic, bold, bold italic, and so on. In one example, the font adjuster 64 may identify an angle of a character (e.g., relative to a plane of the text) and translate the angle in the handwritten original text 42 to a character of the custom handwritten font 28 to italicize a corresponding character in the unique machine text 50. Angles may be ignored, however, based on user preference. In another example, a contact pressure may provide wider strokes for a character, which indicates to the font adjuster 64 that a corresponding character in the unique machine text 50 is to be bold. In a further example, the font adjuster 64 may translate an underline in the handwritten original text 42 to the unique machine text 50. The font adjustor 64 may also adjust a color of the unique machine text 50 by, for example, identifying a shape surrounding a character (e.g., a box used to highlight a word, etc.). Preferences may be defined via, e.g., an adjustment menu.

The illustrated apparatus 10 further includes a font editor 66 that may correct the unique machine text 50. In the illustrated example, the font editor 66 includes an editor input executor 68 that may process the unique machine text 50 based on an editor menu input 70 (e.g., dialog, right-click menu, etc.) to correct a portion of the unique machine text 50 incorrectly corrected, substituted, modified, etc., to correct a portion of the unique machine text 50 according to a preference, and so on. For example, a user may select a character with an electronic stylus and press a button on the electronic stylus to erase a character that was incorrectly corrected, substituted, modified, etc.

In addition, the illustrated font editor 66 includes an editor gesture executor 72 that may process the unique machine text 50 based on a writing gesture 74 to correct a portion of the unique machine text 50 incorrectly corrected, substituted, modified, etc., to correct a portion of the unique machine text 50 according to a preference, and so on. For example, the editor gesture executor 72 may ignore and/or erase a portion of the unique machine text 50 based on a strikethrough gesture, separate a portion of the unique machine text 50 based on a split gesture, create a blank space in a portion of the unique machine text 50 based on a replacement gesture, replace a portion of the unique machine text 50 based on an overwrite gesture, and so on.

The illustrated apparatus 10 further includes a font learner 76 that may learn from a correction to the unique machine text 50. The illustrated font learner 76 may include an adjustment identifier 78 to identify an adjustment made to the unique machine text 50. In addition, the illustrated font learner 76 includes a knowledge distributor 80 that may share the adjustment, wherein the adjustment may be applied to the custom handwritten font and/or future handwritten original text. Thus, for example, the font learner 76 may communicate the adjustment to the handwriting recognizer 40, the font substitutor 48, and/or to the custom handwritten font 28 to indicate that a particular character is to be recognized and/or substituted in a particular manner. Thus, in one example where a user may write a word with the character "w" that is substituted with the character "v", the user may correct the substituted character "v" (e.g., with an overwrite gesture by overwriting the character "v" with the character "w") and the font learner 76 may learn that the user's style of the character "w" for future handwriting text.

Any or all components of the apparatus 10 may execute as logic (e.g., logic instructions, configurable logic, fixed-functionality logic hardware, etc., or any combination thereof). In addition, the components of the apparatus 10 may be arranged in any configuration, on the same or different physical or virtual machines. In one example, only the handwriting recognizer 40 and the font substitutor 48 may be located together at the apparatus 10 to provide font substitution.

In another example, only the training text generator 14 and the font trainer 26 may be located physically external to the apparatus 10 and accessible via a communication interface (e.g., a network interface card) over a computer network to provide a custom handwritten font. In a further example, the data storage device 28 may be located physically external to the apparatus 10 as a physical memory address space. Moreover, one or more components of the apparatus 20 may be combined into a single component or separated into individual components such as, e.g., when the training text generator 14 and the font trainer 26 are combined. In another example, two or more components of the font trainer 26 may be combined to provide a single font generator, such as when the character extractor 36 and the character generator 38 are combined. Additionally, the example flow denoted by dashed arrows may be modified.

Figures 2, 3:
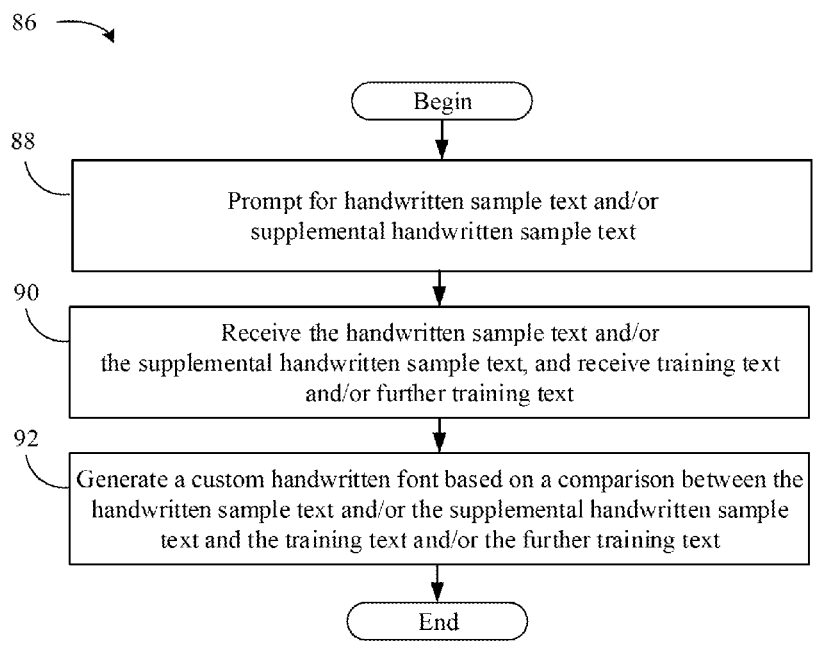
FIG. 2 is an example of handwritten text substitution based on a custom handwritten font according to an embodiment.
FIG. 3 is a flowchart of an example of a method to provide a custom handwritten font according to an embodiment.

Turning now to FIG. 2, text substitution 82 is shown in which handwritten original text 83 is converted to unique machine text 84 by processing of the handwritten original text 83 based on writing gestures and by a substitution of the handwritten original text 83 with a custom handwritten font. In the illustrated example, some words of the handwritten original text 83 are moderately legible (e.g., "Congratulations"), one word (e.g., "date") and one letter (e.g., "a" in "you're") of handwritten original text 83 are crossed out, and one letter is overwritten (e.g., "a" in "graat" overwritten with "e").

In the illustrated example, the handwritten original text 83 is processed based on the writing gestures to provide clean text in the unique machine text 84. For example, the word (e.g., "date") and the letter (e.g., "a" in "you're") that were crossed out, as well as the letter that was overwritten (e.g., "a" in "graat"), in the handwritten original text 83 are deleted and are absent in the unique machine text 84. In addition, all of the characters (e.g., letters, words, and punctuation marks) of the unique machine text 83 are more legible since they have been substituted with a user's best or preferred handwriting using the custom handwriting font.

FIG. 3 shows a method 86 to provide a custom handwritten font. The method 86 may generally be implemented in a computing architecture such as the apparatus 10 (FIG. 1), already discussed. More particularly, the method 86 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 86 may be written in any combination of one or more programming languages, including an object oriented programming language such as C#, JAVA or the like.

Illustrated processing block 88 provides for prompting for handwritten sample text and/or supplemental handwritten sample text (e.g., to satisfy a predetermined match threshold). Illustrated processing block 90 provides for receiving the handwritten sample text and/or the supplemental handwritten sample text. In addition, the processing block 90 provides for receiving training text and/or further training text. Illustrated processing block 92 provides for generating a custom handwritten font based on a comparison between the handwritten sample text and the training text, and/or between the supplemental handwritten sample text and the further training text.

The illustrated processing block 92 may provide for matching characters from the handwritten sample text with characters from the training text, and/or characters from the supplemental handwritten sample text with characters from the further training text. In addition, the illustrated processing block 92 may provide for determining whether a predetermined match threshold is satisfied. Moreover, the illustrated processing block 92 may provide for extracting characters from the handwritten sample text that are matched with characters from the training text, and/or extracting characters from the supplemental handwritten sample text that are matched with characters from the further training text. Also, the illustrated processing block 92 may provide for synthesizing characters for unmatched characters between the handwritten sample text and the training text, and/or between the supplemental handwritten sample text and the further training text.

Any of the illustrated processing blocks may be omitted, rearranged, and/or combined with other processing blocks. For example, the method 88 may provide for converting handwritten original text to unique machine text based on a substitution of the handwritten original text with the custom handwritten font, correcting the handwritten sample text, modifying the unique machine text, correcting the unique machine text, and/or learning from a correction to the unique machine text.

Figure 4:
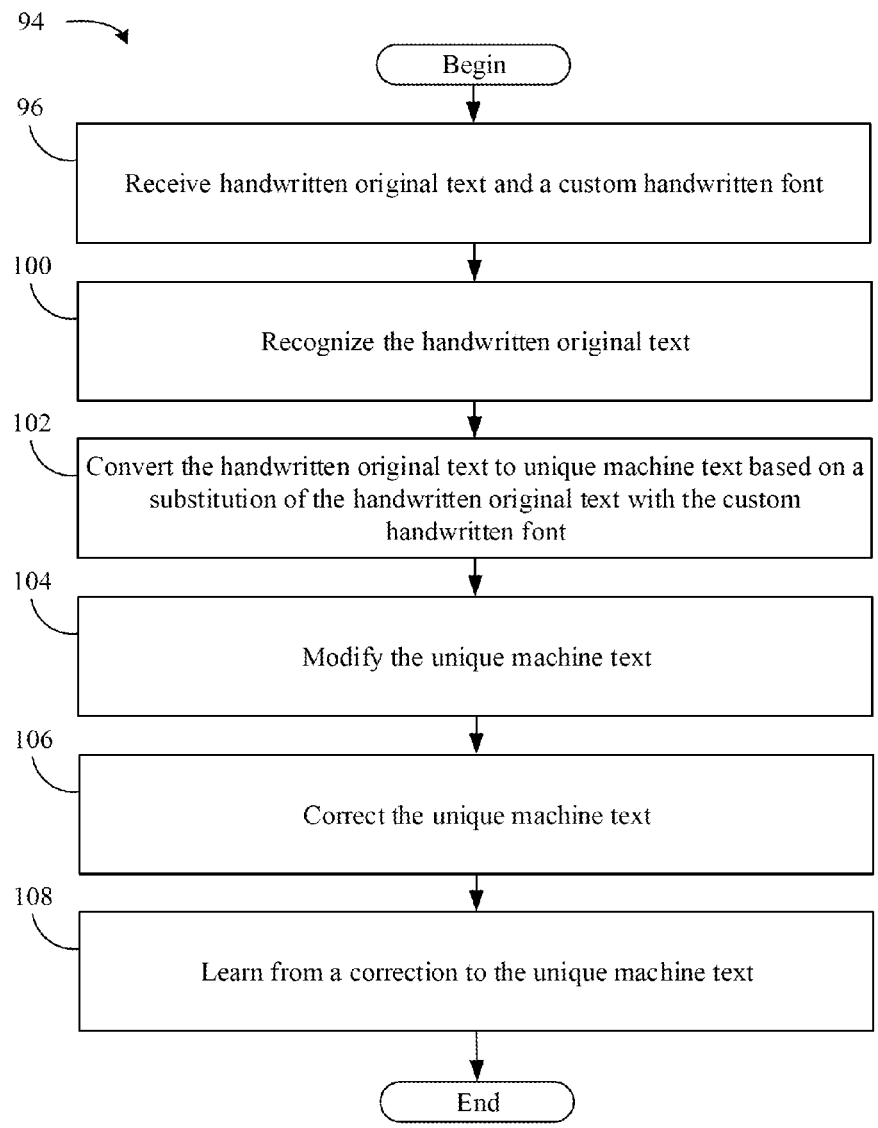
FIG. 4 is a flowchart of an example of a method to provide text substitution according to an embodiment.

FIG. 4 shows a method 94 to provide text substation. The method 94 may generally be implemented in a computing architecture such as the apparatus 10 (FIG. 1), already discussed. More particularly, the method 94 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 94 may be written in any combination of one or more programming languages, including an object oriented programming language such as C#, JAVA or the like.

Illustrated processing block 96 provides for receiving handwritten original text and receiving a custom handwritten font. Illustrated processing block 98 provides for recognizing the handwritten original text. In one example, the processing block 98 may provide for identifying each character in the handwriting original text by using feature and/or pattern recognition processes. The processing block 98 may also provide for processing the handwritten original text based on a writing gesture. For example, the processing block 98 may provide for ignoring and/or erasing a portion of the handwritten original text based on a strikethrough gesture, separating a portion of the handwritten original text based on a split gesture, creating a blank space in a portion of the handwritten original text based on a replacement gesture, and/or replacing a portion of the handwritten original text based on an overwrite gesture.

Illustrated processing block 100 provides for correcting the handwritten original text. For example, the processing block 100 may correct a typo, a misspelling, a punctuation, usage, grammar, syntax, consistency, and/or accuracy of the handwritten original text. Illustrated processing block 102 provides for converting the handwritten original text to unique machine text based on a substitution of the handwritten original text with the custom handwritten font. For example, illustrated processing block 102 may include associating characters from the handwritten original text with characters from the custom handwritten font, converting the handwritten original text to the unique machine text based on a writing threshold as the handwritten original text is being created, and/or converting the handwritten original text to the unique machine text based on a conversion user input when a predetermined amount (e.g., all) of the handwritten original text is created.

Illustrated processing block 104 provides for modifying the unique machine text. For example, the processing block 104 may provide for smoothly merging the unique machine text, normalizing a size and/or a spacing of the unique machine text, and/or adjusting a color and/or a style of the unique machine text. Illustrated processing block 106 provides for correcting the unique machine text. For example, the processing block 106 may provide for processing the unique machine text based on an editor menu input and/or processing the unique machine text based on a writing gesture. In one example, the processing block 106 may provide for ignoring and/or erasing a portion of the unique machine text based on a strikethrough gesture, separating a portion of the unique machine text based on a split gesture, creating a blank space in a portion of the unique machine text based on a replacement gesture, and/or replacing a portion of the unique machine text based on an overwrite gesture.

Illustrated processing block 108 provides for learning from a correction to the unique machine text. For example, processing block 108 may provide for identifying an adjustment made to the unique machine text and/or sharing the adjustment. In one example, the adjustment may be applied to the custom handwritten font and/or future handwritten original text.

Any of the illustrated processing blocks may be omitted, rearranged, and/or combined with other processing blocks. For example, the method 94 may omit the processing blocks 104-108. In another example, the method 94 may provide for generating training text and/or generating the custom handwritten font based on a comparison between handwritten sample text and the training text.

Figure 5:
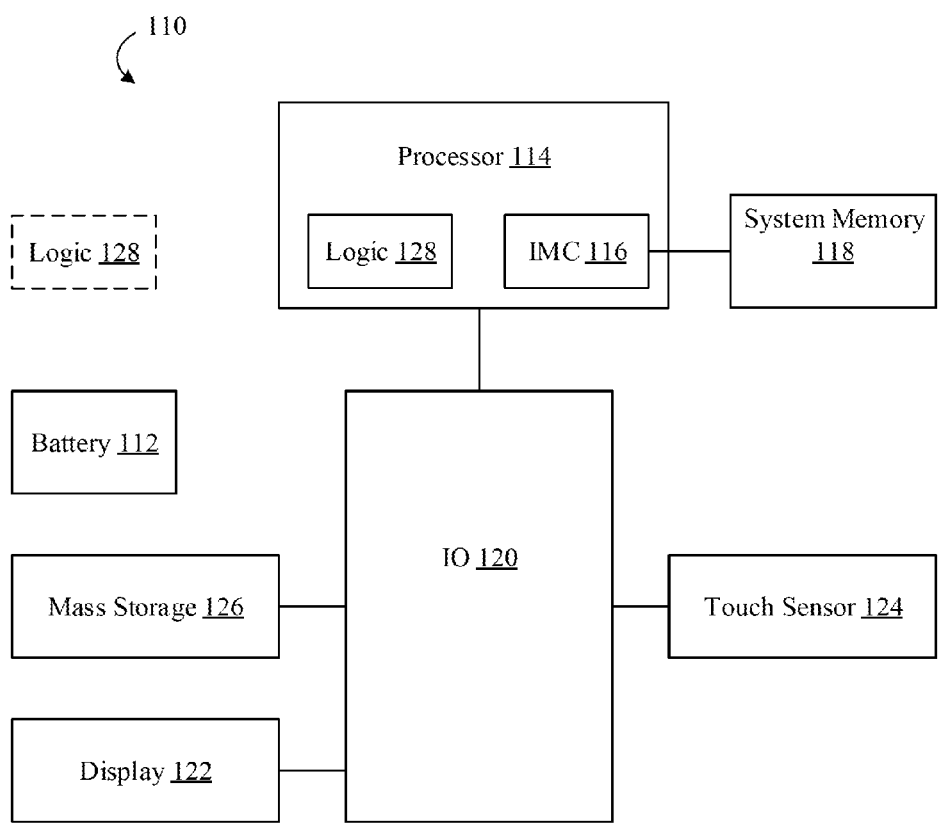
FIG. 5 is a block diagram of an example of a computing device according to an embodiment.

Turning now to FIG. 5, a computing device 110 is illustrated according to an embodiment. The computing device 110 may be part of a platform having computing functionality (e.g., personal digital assistant/PDA, notebook computer, tablet computer), communications functionality (e.g., wireless smart phone), imaging functionality, media playing functionality (e.g., smart television/TV), wearable functionality (e.g., watch, eyewear, headwear, footwear, jewelry) or any combination thereof (e.g., mobile Internet device/MID). In the illustrated example, the device 110 includes a battery 112 to supply power to the device 110 and a processor 114 having an integrated memory controller (IMC) 116, which may communicate with system memory 118. The system memory 118 may include, for example, dynamic random access memory (DRAM) configured as one or more memory modules such as, for example, dual inline memory modules (DIMMs), small outline DIMMs (SODIMMs), etc.

The illustrated device 110 also includes a input output (IO) module 120, sometimes referred to as a Southbridge of a chipset, that functions as a host device and may communicate with, for example, a display 122 (e.g., touch screen, liquid crystal display/LCD, light emitting diode/LED display), a touch sensor 124 (e.g., a touch pad, etc.), and mass storage 126 (e.g., hard disk drive/HDD, optical disk, flash memory, etc.). The illustrated processor 114 may execute logic 128 (e.g., logic instructions, configurable logic, fixed-functionality logic hardware, etc., or any combination thereof) configured to function similarly to the apparatus 10 (FIG. 1). Thus, the computing device 110 may provide text substitution and/or may provide a custom font.

ADDITIONAL NOTES AND EXAMPLES

Example 1 may include a system to provide text substitution comprising a font trainer to receive handwritten sample text based on training text, receive the training text, and/or generate a custom handwritten font based on a comparison between the handwritten sample text and the training text, and/or a font substitutor to receive handwritten original text, receive the custom handwritten font, and/or convert the handwritten original text to unique machine text based on a substitution of the handwritten original text with the custom handwritten font.

Example 2 may include the system of Example 1, further including a display device to display the handwritten sample text, the training text, the custom handwritten font, and/or the unique machine text, and/or a data storage device to store the handwritten sample text, the training text, the custom handwritten font, and/or the unique machine text.

Example 3 may include an apparatus to provide text substitution comprising a font substitutor to receive handwritten original text, receive a custom handwritten font, and/or convert the handwritten original text to unique machine text based on a substitution of the handwritten original text with the custom handwritten font.

Example 4 may include the apparatus of Example 3, further including a training text generator to generate training text, and/or a font trainer to generate the custom handwritten font based on a comparison between handwritten sample text and the training text.

Example 5 may include the apparatus of any one of Examples 3 to 4, further including a writing corrector to correct a typo, a misspelling, a punctuation, usage, grammar, syntax, consistency, and/or accuracy of the handwritten original text.

Example 6 may include the apparatus of any one of Examples 3 to 5, further including a handwriting recognizer to recognize the handwritten original text, wherein the handwriting recognizer is to include a recognizer gesture executor to process the handwritten original text based on a writing gesture, wherein the recognizer gesture executor is to ignore and/or erase a portion of the handwritten original text based on a strikethrough gesture, separate a portion of the handwritten original text based on a split gesture, create a blank space in a portion of the handwritten original text based on a replacement gesture, and/or replace a portion of the handwritten original text based on an overwrite gesture.

Example 7 may include the apparatus of any one of Examples 3 to 6, further including a font modifier to modify the unique machine text, wherein the font modifier is to include a font merger to smoothly merge the unique machine text, a font normalizer to normalize one or more of a size or a spacing of the unique machine text, and/or a font adjuster to adjust one or more of a color or a style of the unique machine text.

Example 8 may include the apparatus of any one of Examples 3 to 7, further including a font editor to correct the unique machine text, wherein the font editor is to include an editor input executor to process the unique machine text based on an editor menu input, and/or an editor gesture executor to process the unique machine text based on a writing gesture, wherein the editor gesture executor is to ignore and/or erase a portion of the unique machine text based on a strikethrough gesture, separate a portion of the unique machine text based on a split gesture, create a blank space in a portion of the unique machine text based on a replacement gesture, and/or replace a portion of the unique machine text based on an overwrite gesture.

Example 9 may include the apparatus of any one of Examples 3 to 8, further including a font learner to learn from a correction to the unique machine text, wherein the font learner is to include an adjustment identifier to identify an adjustment made to the unique machine text, and/or a knowledge distributor to share the adjustment, wherein the adjustment is to be applied to the custom handwritten font and/and future handwritten original text.

Example 10 may include the apparatus of any one of Examples 3 to 8, wherein the font substitutor is to include a character associator to associate characters from the handwritten original text with characters from the custom handwritten font, a real-time converter to convert the handwritten original text to the unique machine text based on a writing threshold as the handwritten original text is being created, and/or an offline converter to convert the handwritten original text to the unique machine text based on a conversion user input when the handwritten original text is created.

Example 11 may include least one computer readable storage medium comprising a set of instructions which, when executed by a device, cause the device to receive handwritten original text, receive a custom handwritten font, and/or convert the handwritten original text to unique machine text based on a substitution of the handwritten original text with the custom handwritten font.

Example 12 may include the at least one computer readable storage medium of Example 11, wherein the instructions, when executed, cause a device to generate training text, and/or generate the custom handwritten font based on a comparison between handwritten sample text and the training text.

Example 13 may include the at least one computer readable storage medium of any one of Examples 11 to 12, wherein the instructions, when executed, cause a device to correct a typo, a misspelling, a punctuation, usage, grammar, syntax, consistency, and/or accuracy of the handwritten original text.

Example 14 may include the at least one computer readable storage medium of any one of Examples 11 to 13, wherein the instructions, when executed, cause a device to recognize the handwritten original text, and/or process the handwritten original text based on a writing gesture, including to ignore and/or erase a portion of the handwritten original text based on a strikethrough gesture, separate a portion of the handwritten original text based on a split gesture, create a blank space in a portion of the handwritten original text based on a replacement gesture, and/or replace a portion of the handwritten original text based on an overwrite gesture.

Example 15 may include the at least one computer readable storage medium of any one of Examples 11 to 14, wherein the instructions, when executed, cause a device to modify the unique machine text, including to smoothly merge the unique machine text, normalize a size and/or a spacing of the unique machine text, and/or adjust of a color and/or a style of the unique machine text.

Example 16 may include the at least one computer readable storage medium of any one of Examples 11 to 15, wherein the instructions, when executed, cause a device to correct the unique machine text, including to process the unique machine text based on an editor menu input, and/or process the unique machine text based on a writing gesture, including to ignore and/or erase a portion of the unique machine text based on a strikethrough gesture, separate a portion of the unique machine text based on a split gesture, create a blank space in a portion of the unique machine text based on a replacement gesture, and/or replace a portion of the unique machine text based on an overwrite gesture.

Example 17 may include the at least one computer readable storage medium of any one of Examples 11 to 16, wherein the instructions, when executed, cause a device to learn from a correction to the unique machine text, including to identify an adjustment made to the unique machine text, and/or share the adjustment, wherein the adjustment is to be applied to the custom handwritten font and/or future handwritten original text.

Example 18 may include the at least one computer readable storage medium of any one of Examples 11 to 17, wherein the instructions, when executed, cause a device to associate characters from the handwritten original text with characters from the custom handwritten font, convert the handwritten original text to the unique machine text based on a writing threshold as the handwritten original text is being created, and/or convert the handwritten original text to the unique machine text based on a conversion user input when the handwritten original text is created.

Example 19 may include a method to provide text substitution comprising receiving handwritten original text, receiving a custom handwritten font, and/or converting the handwritten original text to unique machine text based on a substitution of the handwritten original text with the custom handwritten font.

Example 20 may include the method of Example 19, further including generating training text, and/or generating the custom handwritten font based on a comparison between handwritten sample text and the training text.

Example 21 may include the method of any one of Examples 19 to 20, further including correcting a typo, a misspelling, a punctuation, usage, grammar, syntax, consistency, and/or accuracy of the handwritten original text.

Example 22 may include the method of any one of Examples 19 to 21, further including recognizing the handwritten original text, and/or processing the handwritten original text based on a writing gesture, including ignoring and/or erasing a portion of the handwritten original text based on a strikethrough gesture, separating a portion of the handwritten original text based on a split gesture, creating a blank space in a portion of the handwritten original text based on a replacement gesture, and/or replacing a portion of the handwritten original text based on an overwrite gesture.

Example 23 may include the method of any one of Examples 19 to 22, further including modifying the unique machine text, including smoothly merging the unique machine text, normalizing one or more of a size or a spacing of the unique machine text, and/or adjusting a color and/or a style of the unique machine text.

Example 24 may include the method of any one of Examples 19 to 23, further including correcting the unique machine text, including processing the unique machine text based on an editor menu input, and/or processing the unique machine text based on a writing gesture, including ignoring and/or erasing a portion of the unique machine text based on a strikethrough gesture, separating a portion of the unique machine text based on a split gesture, creating a blank space in a portion of the unique machine text based on a replacement gesture, and/or replacing a portion of the unique machine text based on an overwrite gesture.

Example 25 may include the method of any one of Examples 19 to 24, further including learning from a correction to the unique machine text, including identifying an adjustment made to the unique machine text, and/or sharing the adjustment, wherein the adjustment is applied to the custom handwritten font and/or future handwritten original text.

Example 26 may include the method of any one of Examples 19 to 25, further including associating characters from the handwritten original text with characters from the custom handwritten font, converting the handwritten original text to the unique machine text based on a writing threshold as the handwritten original text is being created, and/or converting the handwritten original text to the unique machine text based on a conversion user input when the handwritten original text is created.

Example 27 may include the apparatus to provide a custom font comprising a font trainer to receive handwritten sample text based on training text, receive the training text, and/or generate a custom handwritten font based on a comparison between the handwritten sample text and the training text.

Example 28 may include the apparatus of Example 27, further including a font substitutor to convert handwritten original text to unique machine text based on a substitution of the handwritten original text with the custom handwritten font, a writing corrector to correct a typo, a misspelling, a punctuation, usage, grammar, syntax, consistency, and/or accuracy of the handwritten original text, a handwriting recognizer to recognize the handwritten original text, a font modifier to modify the unique machine text, a font editor to correct the unique machine text, and/or a font learner to learn from a correction to the unique machine text.

Example 29 may include the apparatus of any one of Examples 27 to 28, further including a training text generator to generate the training text, wherein the training text generator is to include an initial sample text requester to prompt for the handwritten sample text, and/or a supplemental sample text requester to prompt for supplemental handwritten sample text based on further training text to satisfy a predetermined match threshold.

Example 30 may include the apparatus of any one of Examples 27 to 29, wherein the font trainer is to include a character matcher to match characters from the handwritten sample text with characters from the training text, and/or a threshold evaluator to determine whether a predetermined match threshold is satisfied.

Example 31 may include the apparatus of any one of Examples 27 to 30, wherein the font trainer is to include a character extractor to extract characters from the handwritten sample text that are matched with characters from the training text, and/or a character generator to synthesize characters for unmatched characters between the handwritten sample text and the training text.

Example 32 may include least one computer readable storage medium comprising a set of instructions which, when executed by a device, cause the device to receive handwritten sample text based on training text, receive the training text, and/or generate a custom handwritten font based on a comparison between the handwritten sample text and the training text.

Example 33 may include the at least one computer readable storage medium of Example 32, wherein the instructions, when executed, cause a device to convert handwritten original text to unique machine text based on a substitution of the handwritten original text with the custom handwritten font, correct a typo, a misspelling, a punctuation, usage, grammar, syntax, consistency, and/or accuracy of the handwritten original text, recognize the handwritten sample text, modify the unique machine text, correct the unique machine text, and/or learn from a correction to the unique machine text.

Example 34 may include the at least one computer readable storage medium of any one of Examples 32 to 33, wherein the instructions, when executed, cause a device to generate the training text, including to prompt for the handwritten sample text, and/or prompt for supplemental handwritten sample text based on further training text to satisfy a predetermined match threshold.

Example 35 may include the at least one computer readable storage medium of any one of Examples 32 to 34, wherein the instructions, when executed, cause a device to match characters from the handwritten sample text with characters from the training text, and/or determine whether a predetermined match threshold is satisfied.

Example 36 may include the at least one computer readable storage medium of any one of Examples 32 to 35, wherein the instructions, when executed, cause a device to extract characters from the handwritten sample text that are matched with characters from the training text, and/or synthesize characters for unmatched characters between the handwritten sample text and the training text.

Example 37 may include a method to provide a custom font comprising receiving handwritten sample text based on training text, receiving the training text, and/or generating a custom handwritten font based on a comparison between the handwritten sample text and the training text.

Example 38 may include the method of Example 37, further including converting handwritten original text to unique machine text based on a substitution of the handwritten original text with the custom handwritten font, correcting a typo, a misspelling, a punctuation, usage, grammar, syntax, consistency, and/or accuracy of the handwritten original text, recognizing the handwritten sample text, modifying the unique machine text, correcting the unique machine text, and/or learning from a correction to the unique machine text.

Example 39 may include the method of any one of Examples 37 to 38, further including generating the training text including prompting for the handwritten sample text, and/or prompting for supplemental handwritten sample text based on further training text to satisfy a predetermined match threshold.

Example 40 may include the method of any one of Examples 37 to 39, further including matching characters from the handwritten sample text with characters from the training text, and/or determining whether a predetermined match threshold is satisfied.

Example 41 may include the method of any one of Examples 37 to 40, further including extracting characters from the handwritten sample text that are matched with characters from the training text, and/or synthesizing characters for unmatched characters between the handwritten sample text and the training text.

Example 42 may include an apparatus to provide text substitution comprising means for performing the method of any one of Examples 19 to 26.

Example 43 may include an apparatus to provide a custom font comprising means for performing the method of any one of Examples 37 to 41.

Thus, techniques described herein may convert written characters (e.g., letters, special characters, words, etc.) automatically in real-time, e.g., as a user lifts a writing implement (e.g., after each word is written) and/or automatically offline (e.g., after any or all characters are written). Accordingly, a user may scribble notes at a relatively fast speed without concern of legibility regarding their handwriting. Indeed, techniques described herein may convert handwritten text (e.g., handwritten characters) to a unique machine text based on a custom handwritten font. In addition, techniques described herein may change the handwritten text to provide a clean version of the handwritten text. Thus, legibility of the handwritten text may be maximized while maintaining a personal look and feel for handwritten communications via the unique machine text. Techniques described herein also provide machine self-learning, which may minimize a burden on a user associated with frequent or redundant corrections.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A system comprising:
   a font trainer to:
   receive handwritten sample text based on training text;
   receive the training text; and
   generate a custom handwritten font based on a comparison between the handwritten sample text and the training text; and
   a font substitutor to:
   receive handwritten original text;
   receive the custom handwritten font; and
   convert the handwritten original text to unique machine text based on a substitution of the handwritten original text with the custom handwritten font, wherein the handwritten original text is to be processed based on a writing gesture including one or more of ignore or erase a portion of the handwritten original text based on a strikethrough gesture, separate a portion of the handwritten original text based on a split gesture, create a blank space in a portion of the handwritten original text based on a replacement gesture, or replace a portion of the handwritten original text based on an overwrite gesture.

2. The system of claim 1, further including one or more of:
   a display device to display one or more of the handwritten sample text, the training text, the custom handwritten font, or the unique machine text; or
   a data storage device to store one or more of the handwritten sample text, the training text, the custom handwritten font, or the unique machine text.

3. An apparatus comprising:
   a font substitutor to:
   receive handwritten original text;
   receive a custom handwritten font; and
   convert the handwritten original text to unique machine text based on a substitution of the handwritten original text with the custom handwritten font, wherein the handwritten original text is to be processed based on a writing gesture including one or more of ignore or erase a portion of the handwritten original text based on a strikethrough gesture, separate a portion of the handwritten original text based on a split gesture, create a blank space in a portion of the handwritten original text based on a replacement gesture, or replace a portion of the handwritten original text based on an overwrite gesture.

4. The apparatus of claim 3, further including one or more of:
   a training text generator to generate training text; or
   a font trainer to generate the custom handwritten font based on a comparison between handwritten sample text and the training text.

5. The apparatus of claim 3, further including a writing corrector to correct one or more of a typo, a misspelling, a punctuation, usage, grammar, syntax, consistency, or accuracy of the handwritten original text.

6. The apparatus of claim 3, further including a font modifier to modify the unique machine text, wherein the font modifier is to include one or more of:
   a font merger to smoothly merge the unique machine text;
   a font normalizer to normalize one or more of a size or a spacing of the unique machine text; or
   a font adjuster to adjust one or more of a color or a style of the unique machine text.

7. The apparatus of claim 3, further including a font editor to correct the unique machine text, wherein the font editor is to include one or more of:
   an editor input executor to process the unique machine text based on an editor menu input; or
   an editor gesture executor to process the unique machine text based on a writing gesture, wherein the editor gesture executor is to one or more of ignore or erase a portion of the unique machine text based on a strikethrough gesture, separate a portion of the unique machine text based on a split gesture, create a blank space in a portion of the unique machine text based on a replacement gesture, or replace a portion of the unique machine text based on an overwrite gesture.

8. The apparatus of claim 3, further including a font learner to learn from a correction to the unique machine text, wherein the font learner is to include one or more of:
   an adjustment identifier to identify an adjustment made to the unique machine text; or
   a knowledge distributor to share the adjustment, wherein the adjustment is to be applied to one or more of the custom handwritten font or future handwritten original text.

9. The apparatus of claim 3, wherein the font substitutor is to include one or more of:
   a character associator to associate characters from the handwritten original text with characters from the custom handwritten font;
   a real-time converter to convert the handwritten original text to the unique machine text based on a writing threshold as the handwritten original text is being created; or
   an offline converter to convert the handwritten original text to the unique machine text based on a conversion user input when the handwritten original text is created.

10. At least one computer readable storage medium comprising a set of instructions which, when executed by a device, cause a device to:
    receive handwritten original text;
    receive a custom handwritten font; and
    convert the handwritten original text to unique machine text based on a substitution of the handwritten original text with the custom handwritten font, wherein the handwritten original text is to be processed based on a writing gesture including one or more of ignore or erase a portion of the handwritten original text based on a strikethrough gesture, separate a portion of the handwritten original text based on a split gesture, create a blank space in a portion of the handwritten original text based on a replacement gesture, or replace a portion of the handwritten original text based on an overwrite gesture.

11. The at least one computer readable storage medium of claim 10, wherein the instructions, when executed, cause a device to one or more of:
   generate training text; or
   generate the custom handwritten font based on a comparison between handwritten sample text and the training text.

12. The at least one computer readable storage medium of claim 10, wherein the instructions, when executed, cause a device to correct one or more of a typo, a misspelling, a punctuation, usage, grammar, syntax, consistency, or accuracy of the handwritten original text.

13. The at least one computer readable storage medium of claim 10, wherein the instructions, when executed, cause a device to modify the unique machine text, including to one or more of:
   smoothly merge the unique machine text;
   normalize one or more of a size or a spacing of the unique machine text; or
   adjust one or more of a color or a style of the unique machine text.

14. The at least one computer readable storage medium of claim 10, wherein the instructions, when executed, cause a device to correct the unique machine text, including to one or more of:
   process the unique machine text based on an editor menu input; or
   process the unique machine text based on a writing gesture, including to one or more of ignore or erase a portion of the unique machine text based on a strikethrough gesture, separate a portion of the unique machine text based on a split gesture, create a blank space in a portion of the unique machine text based on a replacement gesture, or replace a portion of the unique machine text based on an overwrite gesture.

15. The at least one computer readable storage medium of claim 10, wherein the instructions, when executed, cause a device to learn from a correction to the unique machine text, including to one or more of:
   identify an adjustment made to the unique machine text; or
   share the adjustment, wherein the adjustment is to be applied to one or more of the custom handwritten font and future handwritten original text.

16. The at least one computer readable storage medium of claim 10, wherein the instructions, when executed, cause a device to one or more of:
   associate characters from the handwritten original text with characters from the custom handwritten font;
   convert the handwritten original text to the unique machine text based on a writing threshold as the handwritten original text is being created; or
   convert the handwritten original text to the unique machine text based on a conversion user input when the handwritten original text is created.

17. An apparatus comprising:
   a font trainer to:
      receive handwritten sample text based on training text;
      receive the training text; and
      generate a custom handwritten font based on a comparison between the handwritten sample text and the training text; and
   a handwriting recognizer to recognize handwritten original text to provide unique machine text, wherein the handwritten original text is to be processed based on a writing gesture including one or more of ignore or erase a portion of the handwritten original text based on a strikethrough gesture, separate a portion of the handwritten original text based on a split gesture, create a blank space in a portion of the handwritten original text based on a replacement gesture, or replace a portion of the handwritten original text based on an overwrite gesture.

18. The apparatus of claim 17, further including one or more of:
   a font substitutor to convert the handwritten original text to the unique machine text based on a substitution of the handwritten original text with the custom handwritten font;
   a writing corrector to correct one or more of a typo, a misspelling, a punctuation, usage, grammar, syntax, consistency, or accuracy of the handwritten original text;
   a font modifier to modify the unique machine text;
   a font editor to correct the unique machine text; or
   a font learner to learn from a correction to the unique machine text.

19. The apparatus of claim 17, further including a training text generator to generate the training text, wherein the training text generator is to include one or more of:
   an initial sample text requester to prompt for the handwritten sample text; or
   a supplemental sample text requester to prompt for supplemental handwritten sample text based on further training text to satisfy a predetermined match threshold.

20. The apparatus of claim 17, wherein the font trainer is to include one or more of:
   a character matcher to match characters from the handwritten sample text with characters from the training text; or
   a threshold evaluator to determine whether a predetermined match threshold is satisfied.

21. The apparatus of claim 17, wherein the font trainer is to include one or more of:
   a character extractor to extract characters from the handwritten sample text that are matched with characters from the training text; or
   a character generator to synthesize characters for unmatched characters between the handwritten sample text and the training text.

* * * * *